United States Patent

DeBlance

[15] 3,643,021
[45] Feb. 15, 1972

[54] VOLTAGE CONTROLLED COLOR FILM RECORDING SYSTEM

[72] Inventor: Donald E. DeBlance, Dallas, Tex.
[73] Assignee: Texas Instruments Incorporated, Dallas, Tex.
[22] Filed: Jan. 2, 1970
[21] Appl. No.: 135

[52] U.S. Cl. ............................................. 178/15, 350/150
[51] Int. Cl. ........................................................ H04l 15/20
[58] Field of Search ................ 178/30, 15; 350/19, 96, 148, 350/154, 160, 312, 267; 355/1; 96/69

[56] References Cited

UNITED STATES PATENTS

| | | | |
|---|---|---|---|
| 3,064,134 | 11/1962 | Kell | 250/213 |
| 2,153,617 | 4/1939 | Eggert et al. | 95/2 |
| 3,521,941 | 7/1970 | Deb et al. | 350/160 |
| 3,503,672 | 4/1970 | Marlowe | 350/160 |
| 3,350,982 | 11/1967 | Marks | 88/24 |
| 3,395,246 | 7/1968 | Stetten | 178/6.8 |

*Primary Examiner*—Kathleen H. Claffy
*Assistant Examiner*—Horst F. Brauner
*Attorney*—James O. Dixon, Andrew M. Hassell, Harold Levine, Rene' E. Grossman, Melvin Sharp and Richards, Harris & Hubbard

[57] ABSTRACT

A photographic film is provided which includes a plurality of film layers each responsive to a different range of light wavelengths. A wavelength filter layer is disposed over the film which is responsive to an electric field for passing different light wavelengths. In the preferred embodiment, the filter layer is composed of a nematic liquid crystal and a dichroic dye. A device such as a cathode-ray tube displays a light image upon the film. Circuitry is provided for selectively applying an electric field across the film for varying the color of the light images exposed upon the film.

20 Claims, 8 Drawing Figures

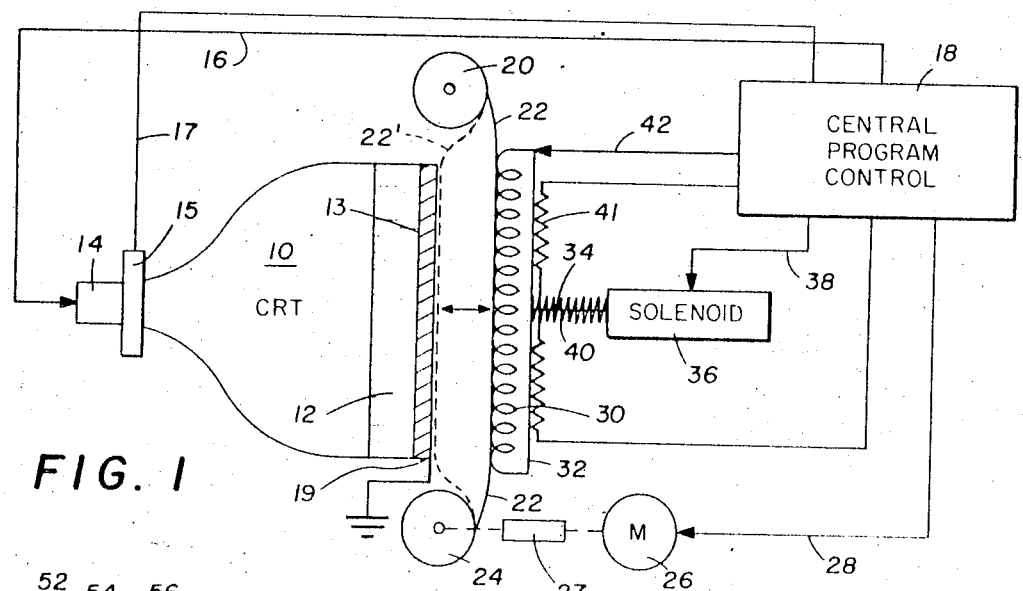
FIG. 1
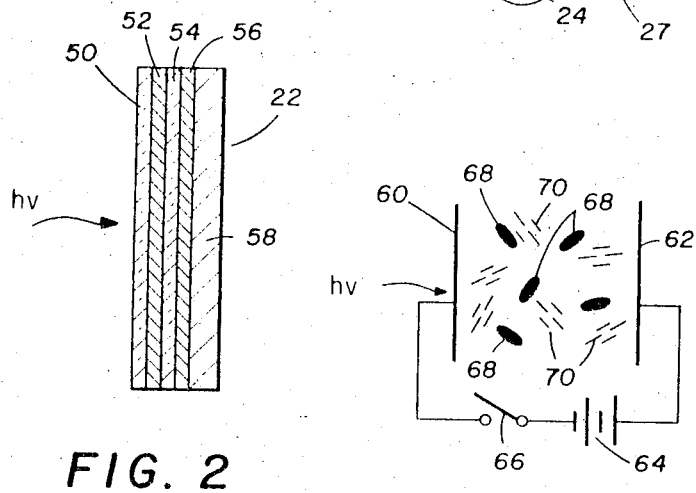
FIG. 2
FIG. 3a
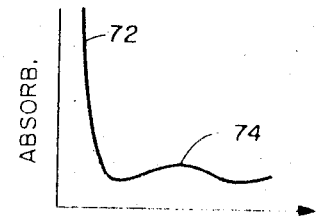
FIG. 3b
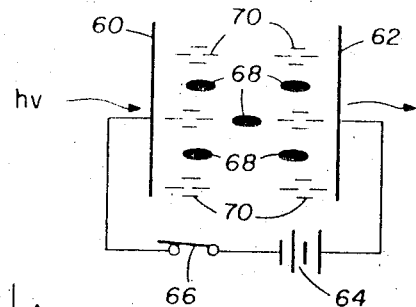
FIG. 4a
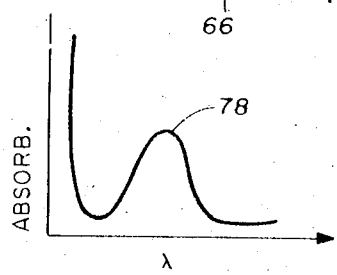
FIG. 4b
INVENTOR
DONALD E. DeBLANCE INVENTOR
DONALD E. DeBLANCE

VOLTAGE CONTROLLED COLOR FILM RECORDING SYSTEM

This invention relates to color photography, and more particularly, to a method and apparatus for selectively imprinting different colors on a film in accordance with the application of a field thereto.

A number of systems are presently being utilized for permanently recording visual images or light patterns projected from a display device such as a cathode-ray tube. Many of these systems require relatively complex vacuum systems in order to mechanically align a film parallel to the display surface, and further often require relatively complex optical surfaces. In many applications, it is often desirable to print certain portions of a light pattern on a film in different colors in order to visually separate information group bases, as the group bases are viewed simultaneously to demonstrate corelations and interactions between the group bases.

Systems have thus heretofore been developed wherein mechanical light filters are sequentially disposed between the display source and the film in order to selectively imprint different colors upon the film. Alternatively, in other prior systems the pattern is broken into several parts and printed upon a like number of different film frames. The different film frames are then developed and combined by shining different colored lights through the different patterns to provide the composite pattern with different colors therein. Another presently existing system generates the different colors by changing the accelerating voltage on a cathode-ray tube so that different phosphor layers inside its faceplate are excited and emit the different colors required.

It is thus an object of the present invention to provide a system for imprinting visual images or patterns in different colors on the same film frame without complex mechanical filters, without complex developing and exposing techniques for combining separately generated images, and without requiring the cathode-ray tube to change its functional parameters.

In accordance with the present invention, structure is provided to direct selected light images upon a film which is responsive to an applied field in order to vary the sensitivity thereof to different light wavelengths. Circuitry is provided to apply a field across the film to thus vary the color of the image exposed on the film.

In accordance with another aspect of the invention, a film is provided which has at least one light wavelength filter layer for passing selected light wavelengths only upon the application of predetermined electric fields. The filter layer comprises material tending to align due to the application of an electric field and a substance having an optical absorption spectrum dependent on the polarization of incident light with respect to the molecular orientation of the substance. Structure is provided to direct light images upon the film, along with circuitry for applying an electric field across the film to control the color imprinted thereon.

In accordance with a more specific aspect of the invention, a device is provided to display light patterns on a transparent surface. A film is registered over the transparent surface to receive the light patterns. The film includes at least one wavelength filter layer which is responsive to an electric field for passing only selected light wavelengths. The filter layer comprises a nematic liquid crystal along with a dichroic dye. Electric fields are selectively applied across the film to vary the color of the light patterns imprinted thereon.

For a more complete understanding of the present invention and for further objects and advantages thereof, reference is now made to the following description taken in conjunction with the accompanying drawings, in which:

FIG. 1 is a block diagram of one of the embodiments of the invention;

FIG. 2 is a diagrammatic sectional view of the voltage sensitive film according to the invention;

Figure 5:
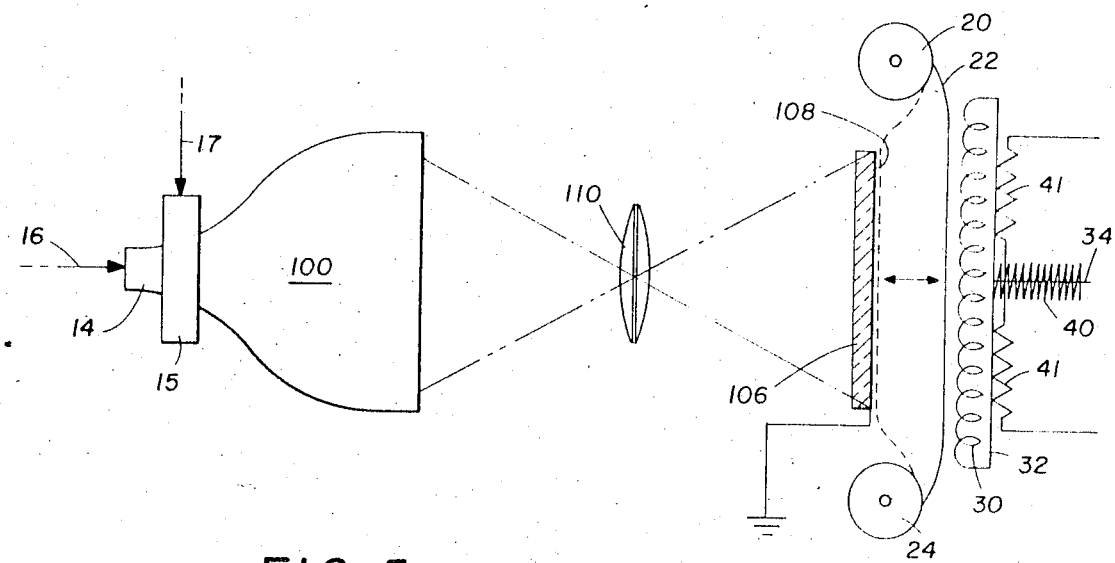
Figure 6:
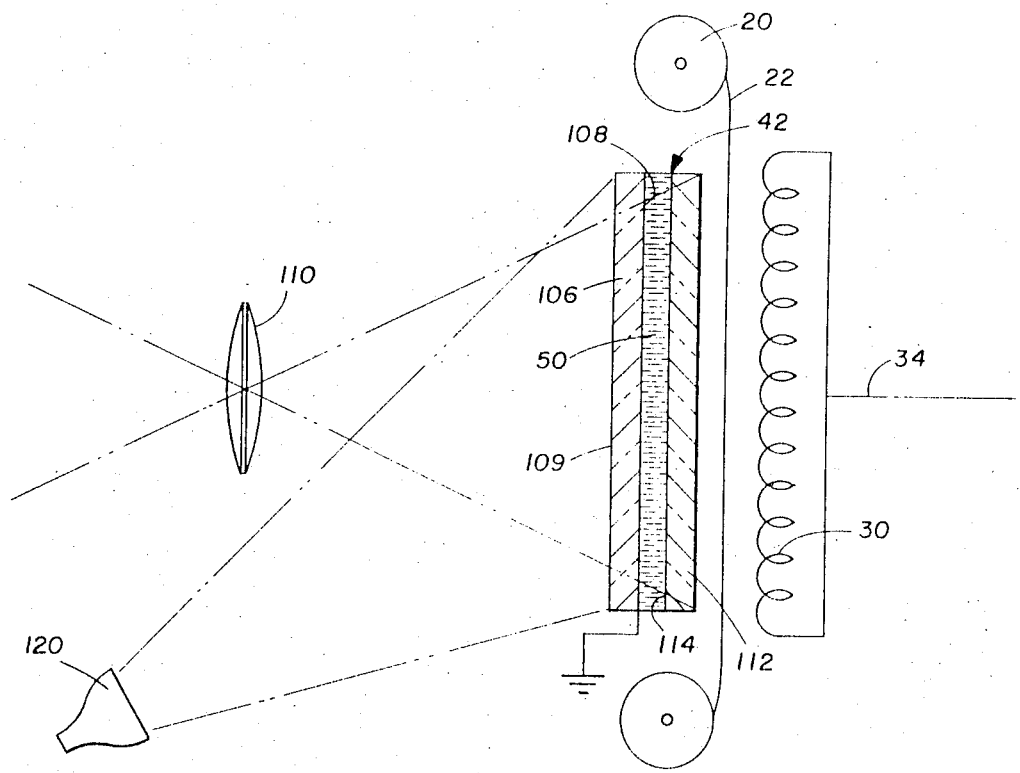

FIGS. 3a-b represent the theory of operation of the present film with no electric field supplied thereto, FIGS. 4a-b diagrammatically represent the theory of operation of the present film with an applied electric field, FIG. 5 illustrates another embodiment of the invention; and FIG. 6 shows yet another embodiment of the invention.

Referring to FIG. 1, a conventional cathode-ray tube 10 includes a fiber optics faceplate 12. The cathode-ray tube 10 and fiber optics faceplate 12 may comprise any suitable conventional equivalent display system, and may comprise, for instance, the fiber optics cathode-ray tube Models L-4199 or L-4221 manufactured an sold by Litton Industries. The cathode-ray tube 10 is provided with a suitable phosphor on the faceplate thereof to produce a source of white light or other light rich in the colors desired. Suitable phosphors for use on the front of the tube 10 may comprise standard $P_4$ or $P_{25}$ phosphors. The fiber optics faceplate may additionally include a polarizing material 13, as shown as element 106 in FIG. 5, to enhance the color selectivity properties of the film filter layer 50 in FIG. 2 as discussed above.

The electrode portion 14 of the cathode ray tube 10 is normally operated at a negative voltage in the range of about −20KV. Beam shaping and deflection elements 15 associated with the cathode-ray tube are of conventional design and function. Operating signals are applied via the line 16 (intensity) and line 17 (deflection and beam shaping) from a central program control circuit 18 in order that predetermined images or light patterns may be transmitted from the cathode-ray tube 10 outwardly via the fiber optics faceplate 12. The fiber optics faceplate 12 provides excellent resolution for the light images displayed by the tube 10. If desired, the inner surface of the faceplate may be shaped spherically to minimize linearity and pincushion distortions common to cathode-ray tubes. The outer surface of the fiber optics faceplate 12 is coated with a transparent conductive material 19, such as tin oxide, which is connected to a reference potential, which generally will be ground or zero voltage.

A reel 20 includes a wound quantity of a photographic film 22 thereon. Film 22 extends in front of the cathode-ray tube 10 and is wound at the lower end about a reel 24. A suitable electric motor 26 is controlled by signals fed via line 28 from the central program control circuit 18. Upon actuation of the motor 26, the reel 24 is rotated via the gear drive 27 in order to advance film 22 across the face of the cathode-ray tube 10 to thereby sequentially register different photographic frames in front of the cathode-ray tube 10.

A springy conductive mesh 30 is mounted upon a backing member 32 which is connected to a solenoid arm 34. A solenoid 36 is operable by signals fed via lead 38 from the central program control 18 in order to move the solenoid arm 34 from the position shown to an outwardly extended position.

A spring 40 normally urges the solenoid arm 34 inwardly. Thus, upon actuation of the solenoid 36, the arm 34 moves the springy conductive mesh 30 to hold the film 22 against the fiber optics faceplate 12 in the dotted line position 22'. The resilient conductive mesh 30 may comprise any suitable conductive springy material, but the preferred embodiment comprises a stainless steel mesh. In some instances, a hard machined surface may be utilized to hold the film 22 against the fiber optics faceplate 12. This aspect of the invention eliminates the necessity of complicated vacuum systems for holding the film in a desired position to receive a light image. Voltage is applied to the conductive mesh 30 via a lead 42 from the central program control 13. Thus an electric field is established between such conductive mesh 30 and the grounded conductive surface 19 of the CRT faceplate.

In operation of the system shown in FIG. 1, a motor 26 is actuated by the central program control 18 in order to rotate the reel 24 via the gear train 27. A selected frame of the film 22 is then registered in front of the fiber optics faceplate 12. A signal is applied via lead 38 to the solenoid 36, whereby the solenoid arm 34 is forced outwardly against the action of the spring 40. The conductive mesh 30 is then moved toward the faceplate 12 in order to firmly hold the film 22 in the dotted line position 22' against the fiber optics faceplate 12. The structure and material of the mesh 30 is selected to result in a firm and uniform pressing of the film 22 against the faceplate 12.

In those cases where heat is required for proper operation of the filter material in the film, the central program control 18 switches a voltage across a heating element 41 and the mesh 30 heats the film by conduction when the solenoid 36 is energized.

The desired light pattern or image signals are fed via the lines 16 and 17 to the cathode-ray tube in the conventional manner, such that the light image or pattern is displayed at high resolution at the fiber optics faceplate 12. When it is desired to provide a pattern with a certain color, a predetermined voltage is applied via the lead 42 to the conductive mesh 30, and the film 22 is exposed to the image. An electric field is thus applied across the film 22, between the conductive mesh 30 and the grounded conductive surface 19 of the CRT faceplate, thereby actuating filter layers in the film as will be subsequently described, such that a predetermined color will be imprinted upon the film. When it is desired to imprint a different light pattern with a different color on the film 22, another predetermined voltage is applied via lead 42 to the conductive mesh 30, thereby making the filter layer transmit that corresponding color. The solenoid 36 may then be deactuated so the spring 40 will move the conductive mesh 30 to the illustrated position, and the film 22 may be registered at the next film frame for recording of different light patterns or images.

The present invention thus provides numerous advantages over previously developed photographic techniques. The cathode-ray tube and its associated beam control electronics are not required to operate under different modes in order to print different colors on the film 22. This results in simplicity of operation, as well as simple linearity, focus and intensity control circuits for the cathode-ray tube. No mechanically moving parts are involved in the changing of color sensitivity of the film 22, thus resulting in a system not susceptible to mechanical vibration, wear or alignment problems. Moreover, the characteristics of the light path from the cathode-ray tube to the film is identical for all colors imprinted. This results in a system wherein the light focus, astigmatism, and position of the light beam is not affected by the color to be recorded. Thus, the registration for patterns of different colors are automatically and exactly controlled by only the cathode-ray tube beam deflection controls.

The present system is adapted to be rapidly operated, with limitations on the speed of switching colors thereof being limited only by the voltage switching time or by the film filter layer settling time, or the heating transfer rate in those cases where the filter layer must be heated. The present film needs only be processed once, thereby eliminating the necessity of multiple processing and also eliminating the requirement of excessive amounts of film necessary to obtain a multicolor print. The developed film of the present invention may be used directly for prints and may be filed for later prints without the special handling which is required to keep different negatives together in prior art devices which utilize different negatives for each different colored pattern.

FIG. 2 illustrates a cross section of the portion of the film 22 for use with the invention. A filter layer 50 is disposed over the face of the film, with a color sensitive emulsion layer 52 disposed in contact therewith. In the preferred embodiment, emulsion layer 52 is sensitive only to light in the yellow light band. A gelatin layer 54 is disposed between a second emulsion layer 56 and the first film layer 52. The gelatin layer 54 is of the conventional composition found in multilayer films commercially available. In other embodiments, the gelatin layer 54 may comprise other materials which also serve as a nematic carrier for other pleochroic dyes to effect a second filter layer. In these embodiments, a multiplicity of alternate filter and emulsion layers can be combined to result in a corresponding multiplicity of colors controlled by a plurality of different voltages. The film layer 56 in the preferred embodiment is sensitive only to light in the red light band. A backing 58, which may comprise plastic or glass, serves as a mechanical support for the film.

In operation of the film shown in FIG. 2, when the filter layer 50 is subjected to an electric field of the correct magnitude, the light wavelength transmission characteristics of the filter layer 50 change. Thus, by selectively subjecting the film to electric fields, different colors may be selectively imprinted upon the film in the manner to be subsequently described in more detail.

FIGS. 3a–b and 4a–b serve to illustrate the theory of operation of the present filter layer of the invention. Basically, the filter layer comprises a material which tends to cooperatively align in an applied electric field. This material is termed the "host" material. Also present is a substance having an optical absorption spectrum which is a strong function of the polarization of the incident light with respect to the molecular orientation thereof. This substance is termed the "guest" material, and the molecular orientation thereof is controlled by the orientation of the "host" material in an applied electric field.

While there are a number of different "host" and "guest" substances available for use with the invention, the preferred embodiment utilizes nematic p-n-butoxybenzoic acid (147°–161° C.) as the "host" material because it is transparent in the visible portion of the light spectrum and methyl-red as the dichroic dye "guest" material because it has the desired color properties.

FIG. 3a schematically illustrates the filter layer of the invention disposed between electrodes 60 and 62. A battery 64 may be connected across the electrodes by the actuation of a switch 66. The dichroic or pleochroic dye molecules are indicated by numeral 68, while the nematic domains are diagrammatically illustrated by the numeral 70. When the switch 66 is open, the electric field disposed between electrodes 60 and 62 is less than that required to cause alignment of the domains and the dichroic dye molecules and nematic domains tend to be randomly oriented.

The dichroic dye molecules have an optical absorption spectrum which is a strong function of the polarization and direction of the incident light with respect to the molecular orientation of the dye. Thus, due to the fact that a portion of the incident light is directed normally to the length of the molecules 68, certain portions of the light wavelength are absorbed thereby. FIG. 3b illustrates the resulting absorption of the instant light by the system shown in FIG. 3a. It will be seen that substantial absorption occurs in the very low wavelengths indicated by the curve portion 72, but the remainder of the useful spectrum has a relatively low absorption to transmitted light. Additionally, at higher wavelengths, a small absorption peak 74 occurs. With use of the methyl-red dichroic dye, with no voltage applied across the filter layer, light in the red and yellow bands is transmitted through the filter layer 50 to provide an orange image on the film by actuating both film planes 52 and 56.

Referring to FIG. 4a, wherein the switch 66 is closed, an electric field is applied across the "guest-host" solution. As the nematic liquid crystals tend to align cooperatively in an applied electric field, the "host" domains 70 tend to become polarized. This polarizing action also tends to align or polarize the dye molecules 68 in the illustrated manner. The incident light is now transmitted generally parallel to the longitudinal axis of the dye molecules, and thus the absorption curve shown in FIG. 4b results. It will be seen that the absorption for the lower light wavelengths remains essentially the same for the solution, but that the absorption peak 78 for higher wavelengths is substantially higher in amplitude than the absorption peak 74 shown in FIG. 3b. Thus, when a sufficiently high-electric field is applied across the filter layer, light in the red band is absorbed by the filter layer 50 to provide only a yellow image upon the film by activating only film plane 52.

Referring to FIG. 2, when a sufficiently high-electric field is applied across the film 22, the filter layer 50 transmits light wavelengths only in the yellow spectra so that the film 52 prints a pattern in yellow. The film layer 56 is responsive only to light in the red wavelengths, and thus no imprinting is provided thereon when an electric field is disposed across the film 22. When no voltage is applied across the film, filter layer 50 transmits both yellow and red light wavelengths so that a yellow pattern is imprinted upon the film layer 52 and a red pattern is imprinted upon the film layer 56. As the yellow and red patterns are aligned, the resulting effect will be an orange pattern upon the film. The present invention thus has capabilities of selectively printing either yellow or orange patterns thereon simply by variance of the electric field across the film.

It is to be understood that various types of different dyes may be utilized in the present invention, as long as the dyes have an optical absorption spectrum which is a strong function of the polarization of the instant light with respect to the molecular orientation thereof. Different dyes utilized on the film 22 of the invention provide different color capabilities thereto. Additionally, more than one filter layer may be utilized with the invention if the "host" material which is responsive to an applied electric field to align cooperatively in each filter layer is responsive to a different voltage threshold. In such an embodiment, a voltage of one magnitude would tend to align one of the filter layers, while a higher voltage would tend to align both the first filter layer and one additional layer, and so on, to allow more than two color capabilities.

The "guest-host" interactions in nematic crystals has been described in an article entitled "Guest Host Interactions in Nematic Liquid Crystals. A New Electro-Optic Effect," published in Applied Physics Letters, by Heilmeier et al., on Aug. 1, 1968. In this disclosure an experiment is described wherein a field of approximately $4\times10^4$ v/cm. (50v at $12\mu$-spacing) was sufficient to switch a solution of nematic p-n butoxybenzoic acid (147°–161° C.) and a 0.1–1 percent by weight methyl-red solution from a reddish-orange color to a yellow color when viewed in transmission using polarized white light. The switching occurred in times of the order of 1–5 msec. in a $12\mu$-thick layer. When the field was removed from the sample, the sample reverted back to its initial condition in approximately 100 msec. The degree of color switching was a function of field strength.

Another article describing the nematic effect more completely is entitled "Domains in Liquid Crystals," published in The Journal of Chemical Physics, v. 39, n. 2, p. 384, by R. Williams on July 15, 1963. In this disclosure, other nematic materials are compared and a detailed experiment with p-azoxyanisole is disclosed. Another article which explains the nematic phenomenon in terms of nuclear magnetic resonance is entitled "Analysis of Nuclear Magnetic Resonance Spectra of Molecules in Liquid-Crystal Solvents" by L. C. Snyder and published in The Journal of Chemical Physics, v. 43, n. 11, p. 4041, on Dec. 1, 1965. The nematic crystals disclosed in these articles may, of course, be utilized in the present invention.

Referring to FIG. 5, a conventional flat faced cathode-ray tube 100 may comprise any suitable conventional equivalent display system and may comprise, for instance, the cathode-ray tube models L4125, L4238 or L4239 manufactured and sold by Litton Industries.

Like numbers in FIGS. 5 and 6 are provided for like and corresponding structure previously described. The program control and certain other features are not shown for ease of illustration. The operation of the cathode-ray tube 100 is very like that of the previously discussed embodiment in FIG. 1, with the exception that the anode of the cathode-ray tube 100 will generally be normally operated in the range of plus 20 KV and the electron portion 14 operated at ground or zero voltage. In this embodiment, when a print is desired, the film 22 is pressed by the conductive mesh 30 against a transparent glass surface 106 which is coated with a transparent conductive surface 108. Surface 108 is connected to circuit ground. The glass 106 can be of the polarizing type which will enhance the color selectivity properties of the filter layer 50. This glass 106 can be type HNCP37 laminated with HEA and RF70G coatings, manufactured and sold by Polaroid Corp.

A lens 110 focuses the light image from the plane of the cathode-ray tube 100 phosphor surface to the plane of the conductive surface 108 on the glass 106. This embodiment thus has the advantage of use with a conventional cathode-ray tube. Also, no problems are presented by the use of heat on the cathode-ray tube face from the heater elements 41 when heat responsive filter layers are utilized.

Referring to FIG. 6, a system is shown for use with those applications wherein it is desirable to use a particular set of compounds in the filter layer 50 along with particular emulsion compounds in layers 52, 54 and 56 which will not function properly under the heat or chemical environment required by, or inherent in, the filter layer 50. Structure is thus provided for separating the filter layer 50 from the remainder of the film 22.

The assembly of FIG. 5 is modified in FIG. 6 in that another transparent glass, quartz, plastic, or the like, material 112 which is coated with a transparent conductive surface 114, is placed between the surface 108 and the film 22. The coating 114 is connected to the color control voltage lead 42 from the central program control 18. The filter layer 50 is disposed between surfaces 108 and 114. The material in the layer 112 serves to insulate the film 22 from the heat of the filter layer 50. It may be preferred that the surface of the material 112 next to the film 22 be cooled by a chilled airflow, or other means, when the film 22 is withdrawn from its surface so that this surface will remain below the temperature which will damage the film 22.

In this embodiment, as in the mechanism illustrated in FIG. 5, the lens 110 focuses the image on the film surface 22, through the elements 106, 108, 50, 114 and 112. A radiant heat source 120 directs heat to the surface 109 of element 106 and thereby heats it so it may, by conduction, heat the filter layer 50. It is recognized that in some applications the material in surface 109 may be a transparent resistive material which would generate the heat upon the passage of current therethrough. Of course, with the use of nematic crystals or other host material not requiring heat, the heat producing structure of the invention may be dispensed with.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A color recording system comprising:
    film including a light wavelength filter layer which passes selected light wavelengths only upon the application of predetermined electric fields, wherein said filter layer comprises both a material tending to molecularly align due to the application of an electric field and a substance having an optical absorption spectrum dependent upon the polarization of incident light with respect to the molecular orientation of said substance,
    means for directing light images upon said film, and
    means for applying an electric field across said film.
2. The photographic system of claim 1 wherein said material comprises a nematic liquid crystal.
3. The photographic system of claim 1 wherein said substance comprises a pleochroic dye.
4. The color recording system of claim 1 wherein said material comprises a nematic liquid crystal and said substance comprises a dichroic dye.
5. The color recording system of claim 1 wherein said film comprises a plurality of film layers each responsive to different light wavelengths and wherein said filter layer comprises a mixture of nematic p-n-butoxy benzoic acid and dichroic dye.
6. The color recording system of claim 5 wherein said dichroic dye comprises:
    a solution of methyl-red.
7. The color recording system of claim 1 wherein said means for directing comprises:
    a cathode-ray tube having fiber optic light transmitting structure on the front thereof.

8. The color recording system of claim 7 and further comprising:
means operable to position said film against said fiber optic structure to receive said light images and further operable to apply an electric field to said film.

9. The color recording system of claim 1 and further comprising:
a cathode-ray tube and lens means for displaying light images upon said film.

10. The color recording system of claim 9 and further comprising:
means for heating said filter layer.

11. The color recording system of claim 10 and further comprising:
means for separating said film and said filter layer, and means for heating solely said filter layer.

12. A color recording system comprising:
means for displaying light patterns on a transparent surface,
means for registering a film over said transparent surface for reception of said light patterns,
said film having at least one light wavelength filter layer which is responsive to an electric field for passing selected light wavelengths,
said filter layer comprising both a material tending to molecularly align upon the application of an electric field and a substance having an optical absorption spectrum dependent upon the polarization of incident light with respect to the molecular orientation of said substance, and
means for applying electric fields, to said filter layer for varying the color of the light patterns imprinted on said film.

13. The color recording system of claim 12 wherein said material comprises a nematic liquid crystal and said substance comprises a dichroic dye.

14. The color recording system of claim 12 wherein said means for displaying comprises:
a cathode-ray tube for displaying an image on a surface.

15. The color recording system of claim 14 and further comprising:
conductive means for holding said film against said surface and for applying an electrical field to said film.

16. The color recording system of claim 15 wherein said conductive means comprises a flexible metallic mesh.

17. The color recording system of claim 16 and further comprising:
solenoid means for selectively moving said conductive means to hold said film against said surface and for moving said conductive means away to allow registration of said film.

18. The color recording system of claim 14 wherein said surface comprises a fiber optics faceplate.

19. The color recording system of claim 14 wherein said surface is illuminated by images projected from said tube through a lens.

20. The color recording system of claim 14 and further comprising:
means for heating said filter layer.

* * * * *